3,063,127
WOVEN FABRIC USEFUL AS A PAPER-MACHINE FELT AND METHOD OF MAKING THE SAME
Thomas Hindle, "Thornlea," Beardwood Brow, and Edward Race, Langdale, Meins Road, both of Blackburn, England
No Drawing. Filed Aug. 8, 1960, Ser. No. 47,955
Claims priority, application Great Britain Aug. 13, 1959
15 Claims. (Cl. 28—72)

This invention pertains to woven fabrics, in particular, to fabric useful as a paper-machine felt, such as is employed in the manufacture of pulp, paper, board, asbestos-cement sheets and pipes, and similar related products. Such felts may be woven in endless form, or woven flat and the ends thereafter joined to form an endless structure in the manner well-known in the art. Thus the expression "endless woven fabric," as used herein, is intended to include not only a fabric which is woven endless (the weft in the loom becoming the warp in the finished fabric), but also an endless woven fabric which is woven flat, as a length, and the ends thereafter joined. Thus in the present description and claims the term "warp" is therefore meant to designate those yarns which extend in the longitudinal direction of the endless finished product, such as a papermaker's dryer felt, and by the term "weft" is meant those yarns arranged in a direction which is transverse of the length of the finished product.

According to earlier practice, these felts were manufactured entirely from wool yarns, or, particularly in the case of the felts used in the production of asbestos-cement products, from a combination of wool and cotton. With the advent of nylon (polyamide), polyester and similar synthetic fibres, it was found that by manufacturing the felts from yarns composed of blends of wool fibres and synthetic fibres, the abrasion-resistance of the felts was greatly improved and the felts exhibited a longer service life.

Whenever, a paper-machine felt is composed entirely of wool or of a mixture of wool and synthetic fibres, milling or fulling is an essential operation in the manufacture of the felt. Thereby, the weave structure of the felt, which would otherwise mark the paper, is masked and yet its permeability to water remains of a high order.

Until recently, it was thought essential that the proportion of synthetic fibres incorporated in the felt must be less than that which would prevent appreciable milling of the felt. However, it has been discovered recently that if an endless fabric, made wholly or predominantly of synthetic fibres, has one or both of its surfaces raised, as by napping, and such raised fabric is subjected to a process of needling, the resultant fabric simulates closely enough a milled felt made wholly or predominantly of wool to be used as a paper-machine felt. The operation of needling is effected in any known manner, as by passing the woven fabric into a machine in which the surface of the fabric is frequently pierced by barbed needles, the result being to force some of the mass of fibres on the raised surface into the body of the fabric.

A modification of the above procedure which has been adopted with reasonable success in some instances is that of weaving a relatively light-weave base fabric predominantly or wholly of synthetic yarns and needling into one or both of its surfaces a non-woven batt or web composed wholly or predominantly of synthetic fibres.

In order to adhere to accepted terminology hereinafter, a fabric made wholly or predominantly of synthetic fibrous material and suitable for use as a paper-machine felt will be called a "felt," even though it is recognized that the term is a misnomer, since synthetic fibres will not felt as do wool fibres.

A paper-machine felt made wholly or predominantly of wool possesses certain marked advantages over any felt which has heretofore been made wholly or predominantly of synthetic fibres. Among the uniquely desirable characteristics which woollen felt possesses is its great resilience and power of rapid recovery from deformation. This is of utmost importance, since a felt, in service on a paper-machine is subjected to cyclical exposure to pressure through the press nips and to alternate extension and compression over the felt rolls. Because of its powers of rapid recovery from deformation, the woollen felt maintains its resilience, its water-removal properties, its non-marking properties and its dimensional stability either until it is worn by mechanical abrasion to the point of uselessness or until it is so blinded by impregnation with solid material from the paper stock that it will no longer fulfill its water-removing functions. On the other hand, a felt made wholly or predominantly of synthetic fibres, as at present made, does not recover rapidly from pressure deformation when it is used to clothe the press of a paper-machine. Consequently, during its service life it becomes dense and non-resilient, and loses its water-removal properties long before it is mechanically worn out.

An object of the present invention is to provide woven textile fabric consisting, at least, predominantly, of synthetic fibrous material and of a weave structure making it acceptable for use as a paper-machine felt, characterized in having a degree of resiliency and power of rapid recovery after deformation, approximately like those of a woven fabric of the same weave structure and consisting predominantly of wool. A further object is to provide a woven textile fabric, at least predominantly, of synthetic fibrous material, which is acceptably permeable to water for use as a paper-machine felt and which retains its initial permeability throughout a period of use (as a paper-machine felt), approximately as long as does a woollen felt. A further object is to provide a woven textile fabric, at least predominantly, of fibrous synthetic material, which is not only acceptably pervious to water for use as a paper-machine felt, but which also has, at least one exposed surface which is smooth and substantially devoid of weave pattern. A further object is to provide a novel method of making woven textile fabric, at least predominantly, of synthetic fibrous material and which possesses the inherent characteristics of high resiliency, power of rapid recovery from deformation, porosity to water and, at least one exterior surface which is substantially smooth, and which is acceptable as a substitute for woollen material for use as a papermaker's felt.

In the attainment of the above objects in accordance with the present invention, a fabric is woven by the concatenation of warp and weft yarns to form a weave structure of a type acceptable for use as a paper-machine felt, and wherein the constituent warp yarns are composed, at least predominantly, of synthetic fibre-forming material, in the form of filaments or staple length fibre, while the weft yarns comprise a combination of crimped synthetic fibres, relatively non-shrinkable by heat, and synthetic fibres which are capable of high lengthwise shrinkage when subjected to heat, and which latter fibres are shrunk, in situ, after weaving.

Certain synthetic fibres exhibit considerable lengthwise shrinkage in hot water; examples are polyvinyl chloride and polyethylene. Recently, there have been produced, both in the United States and in England, polyester fibres which possess an inherent shrinkage of upwards of 50% at temperatures approaching 100° C. These shrinkable fibres have been used to produce non-woven, compact, felt-like synthetic fabrics by needle-punching a uniform batt of the fibres and then passing the entangled mass of fibres through a hot water bath. Such a non-woven fabric would be completely useless as a paper-machine felt because (a) its water permeability would be only a small fraction of that required; and (b) its strength and dimensional stability would be inadequate to withstand the tensions to which an operating paper-machine felt is subjected.

In the development of the present invention it was first suggested that an acceptable paper-machine felt could be made by using, as weft, yarns spun from shrinkable synthetic fibres and subjecting the woven fabric to a hot water shrinking process in the expectation that a bulky, resilient, highly permeable felt would result. It was found, however, that when the fibres of the weft yarns shrank, the whole felt merely became more dense, with virtually no increase in thickness, no improvement in resilience, and a marked decrease in water permeability.

When, however, yarns were spun from a uniform blend of shrinkable synthetic fibres and a relatively non-shrinkable, crimped synthetic fibres, and an endless woven fabric was made using these yarns as weft yarns, there resulted, after a hot water shrinking process, a bulky, resilient, highly permeable felt. In shrinking, the shrinkable synthetic fibres of the weft had caused the relatively non-shrinkable, crimped synthetic fibres to assume more tortuous paths within the weft yarns which were thereby bulked, producing a felt of desirable characteristics.

As a result of further experimentation, it has been found that the relatively non-shrinkable, crimped synthetic fibre component of the weft yarn may be any of the commercially-produced crimped synthetic staple fibres, such as nylon, or those sold under the registered trademarks Terylene, Dacron, Courtelle, etc. It has also been found that felts with highly desirable characteristics can be produced when the non-shrinkable, crimped synthetic staple fibre component of the weft yarn is prepared by cutting (into staple fibres of suitable length) those commercially-produced, crimped continuous filament yarns which are also known as "bulked yarns"; "stretch yarns"; and "bulked and stretch yarns." The so-called "textured" synthetic yarns are normally produced as continuous filament yarns. It has been discovered that when such textured yarns are cut to staple fibre length, the relatively short fibres so produced are highly crimped and admirably suited for use as the relatively non-shrinkable, crimped synthetic fibre component of the weft yarns employed in making a felt in accordance with the invention. Thus, as herein employed, the term "crimped" is to be understood as broadly inclusive of textured yarn cut to staple length. Examples of suitable textured yarns are those sold under the registered trademarks Taslan-textured nylon or Taslan-textured Dacron (Taslan is a registered trademark, the property of E. I. du Pont de Nemours and Co.) and Agilon (a registered trademark, the property of Imperial Chemical Industries Ltd.) which is edge-crimped continuous filament nylon.

Depending on the type of paper-machine felt to be produced, and its use in service, the proportion of shrinkable synthetic fibres in the weft yarns can be as low as 20% by weight or as high as 80% by weight.

The warp yarns employed in making a wholly or predominantly synthetic paper-machine felt, according to the present invention, may be continuous filament synthetic yarns, or yarns each composed of a core of continuous filament synthetic yarns around which is wrapped a finer Taslan-textured yarn, or yarns spun from normal crimped synthetic staple fibres, or yarns spun from non-crimped synthetic staple fibres, or yarns spun from a blend of normal crimped and non-crimped synthetic staple fibres.

We have found it beneficial in certain cases to incorporate in the fibre blend from which the weft yarns are spun a proportion, not exceeding 30% by weight, of wool fibres. When this is done, we prefer to subject the felt to a milling treatment, before shrinking the shrinkable fibres in the weft yarns of the felt in hot water. We have also found that, whether or not wool fibres are incorporated in the fibre blend from which the weft yarns are spun, there are certain cases in which it is beneficial to incorporate a proportion, but not exceeding 30% by weight, of wool. When the warp is composed of spun yarns, the wool is incorporated by blending the requisite proportion of wool fibres with the synthetic fibres before the yarn is spun. When the warp is composed of continuous filament yarns, or of textured continuous filament yarns, such as Taslan, the wool is incorporated by winding a wool yarn around a core of the synthetic continuous filament or textured continuous filament yarns.

We have found that the fibre-bonding process applied to paper-machine felts made wholly or predominantly of synthetic fibrous materials, as described in our copending United States application Serial No. 47,956, filed August 8, 1960, can be satisfactorily applied to the felts made in accordance with this specification.

It has been discovered that although the felt of the present invention is predominantly of synthetic material, the novel composition of its constituent yarns is such, together with the treatment to which it is subjected after weaving, that it is permissible to subject it to napping and needling operations for the production of a smooth surface without harmful reduction in porosity. Thus it may be subjected to a relatively light needling, as compared to that to which woolen felts are usually treated, either after weaving and before treatment with hot water, or after the felt has been shrunk widthwise by hot water. However, if such treatment be used, the needling should not be unduly prolonged, since even this felt may be weakened by excessive needling.

Since woven fabrics for use as paper-machine felts are made according to various weave structures from yarns of different degrees of fineness and vary in weight per unit of area, no attempt is made herein to define the invention by dimensional limitations, since the novelty of the present invention is not dependent upon such factors.

EXAMPLE 1

A fabric of a structure suitable for use as a paper-machine felt is woven endless. The warp yarns of the fabric are Taslan-textured continuous filament yarns. The weft yarns of the fabric are spun from a uniform blend of equaly weights of Agilon (made from continuous filament nylon yarn of 6 denier per filament and cut to a staple fibre length of 4.5 inches), and Dacron staple fibre which is capable of shrinking 50% of its length at temperatures approaching 100° C. This shrinkable Dacron is of 3 denier per filament before shrinking and has a staple length before shrinking of 6 inches. After being woven, the endless fabric is treated in water at 96° C. for 5 minutes, which shrinks the Dacron fibres, thereby causing the Agilon fibres to assume more tortuous paths within the weft yarns, reducing the felt width by approximately 30% and producing a bulky, resilient all-synthetic paper-machine felt.

EXAMPLE 2

A fabric of a structure suitable for use as a paper-machine felt is woven endless. The warp yarns of the fabric are spun from uncrimped staple fibres produced by cutting continuous filament, high-tenacity nylon of 6 denier per filament into fibers of a staple length of 4 inches. The weft yarns of the fabric are spun from a uniform blend of 60% by weight of crimped nylon fibres of 4 denier per filament and of a fibre length of 4.5 inches, and 40% by weight of Dacron fibres which are capable of shrinking 45% lengthwise when subjected to temperature approaching 100° C. This shrinkable Dacron is of 3 denier per filament and has a staple length before shrinking of 7½ inches. After being woven, the fabric is treated in water at 95° C. for 5 minutes. After the fabric has been subjected to the normal washing and drying processes, its working surface is raised on a napping machine.

EXAMPLE 3

A fabric of a structure suitable for use as a paper-machine felt is woven endless. The warp yarns of the fabric are composed of twisted strands each comprising a core of 840 denier continuous filament high-tenacity nylon over-wrapped with 70 denier Taslan-textured continuous filament nylon. The weft yarns are spun from a uniform blend of 70% by weight of Agilon made from continuous filament nylon yarn of 6 denier per filament and cut to a staple fibre length of 4 inches, and 30% by weight of Dacron staple fibre which is capable of shrinking 55% of its length at temperatures approaching 100° C. This shrinkable Dacron is of 4 denier per filament before shrinking and has a staple length before shrinking of 7½ inches. After being woven, both surfaces of the endless fabric are gently raised on a napping machine and are then subjected to a needling process in a needle-punching machine. The fabric is then treated in water at 95° C. for 5 minutes.

EXAMPLE 4

A fabric of a structure suitable for use as a paper-machine felt is produced by either of the methods described in Examples 1 or 2. After the fabric has been treated in hot water, both surfaces are raised on a napping machine and then subjected to a needling process on a needle-punching machine.

EXAMPLE 5

A fabric of a structure suitable for use as a paper-machine felt is woven endless, wherein the warp yarns of the fabric are spun from a uniform blend of 75% by weight of crimped nylon staple fibre of 6 denier per filament and 25% by weight of wool; the weft yarns are spun from a uniform blend of 40% by weight of Agilon which consists of edge-crimped continuous filament nylon yarn of 6 denier per filament, cut to a staple fibre length of 4.5 inches; 25% by weight of wool; and 35% by weight of Dacron staple fibre which is capable of shrinking 50% of its length at temperatures approaching 100° C., the shrinkable Dacron being of 4 denier per filament and has a staple length before shrinking of 6 inches. After being woven, the fabric is milled in a milling machine and is then treated in water at 95° C. for 5 minutes.

EXAMPLE 6

A fabric of warp and weft yarns similar to those employed in Example 5 is woven endless; milled in a milling machine; and both surfaces of the fabric are raised on a napping machine and then subjected to needling in a needle-punching machine; and the fabric is then treated in water at 95° C. for 5 minutes.

EXAMPLE 7

A fabric of warp and weft yarns similar to those employed in Example 5 is woven endless and milled in a milling machine. The woven milled fabric is treated in water at 95° C. for 5 minutes. Both surfaces of the fabric are then raised on a napping machine and subjected to needling in a needle-punching machine.

EXAMPLE 8

A fabric of a structure suitable for use as a paper-machine felt is woven endless. The warp yarns of this fabric consist of a core of Taslan-textured nylon around which is helically wound a finer wool yarn, the wool component constituting 25% of the total weight of warp yarn. The weft yarns are similar to those employed in Example 5. After being woven, the fabric is milled in a milling machine and is then treated in water at 95° C. for 5 minutes.

It is obvious, if for example, the mill which weaves the fabric is not equipped to subject it to the fibre shrinking process, that the fabric, as it comes from the loom, may be sent to a processing establishment where it may be treated with hot water, as above described, for shrinking the fibres, and then returned to the original mill. On the other hand, especially when the fabric is a flat fabric, as delivered from the loom, as distinguished from an endless woven fabric, it might be sold in the condition in which it leaves the loom to one who would cut it to desired lengths, join the ends to form an endless felt and subject the felt to the fibre shrinking operation.

Definitions

Definitions of term hereinabove employed in referring to some of the fibres which have been found useful in the practice of the invention.

As employed herein, the term "low-shrinkage" or "relatively low-shrinkage" is intended to refer to a heat-shrinkage, approximately that of conventional synthetic fibres, where length-shrinkage is from 3% to 8% when heated to approximately 100° C.

Synthetics Specifically Referred To

| Trademark or name: | Class of synthetic |
| --- | --- |
| Nylon | Polyamide. |
| Orlon (E. I. du Pont de Nemours and Co.) | Acrylic. |
| Terylene (Imperial Chemical Industries, Ltd.) | Polyester. |
| Dacron (E. I. du Pont de Nemours and Co.) | Polyester. |
| Agilon (Imperial Chemical Industries, Ltd. (filament nylon cut to staple length)) | Polyamide. |
| Taslan-textured nylon (E. I. du Pont de Nemours and Co.) | Polyamide. |
| Taslon-textured Dacron (E. I. du Pont de Nemours and Co.) | Polyester. |

As herein employed the term "Taslon textured" is intended to refer to textured, bulked or looped continuous filament synthetic yarn which has relatively little stretch (for example, not over 30% at breaking load) and relatively little shrinkage (for example, from 5% to 8% in boiling water) as compared with stretchable textured yarns which may stretch as much as 100% under very low load, while so-called shrinkable yarns will shrink from 40% to 75% in boiling water.

While certain examples, as respects material, proportions, relative dispositions in the yarns or fabric, as well as a desirable sequence of method steps have hereinabove been set forth, it is to be understood that the invention is not limited thereto, but only as defined in the appended claims.

We claim:

1. A woven fabric, suitable for use as a paper-machine felt, consisting, at least predominantly, of synthetic fibre-forming material, characterized in that the fabric is woven of warp yarns comprised, at least predominantly, of synthetic fibre-forming material and of weft yarns consisting, at least predominantly, of a uniform blend comprising 40% or more, by weight, of crimped synthetic fibres relatively non-shrinkable by heat, and other synthetic fibres of a kind which are initially capable of high lengthwise shrinkage when subjected to heat and which latter fibres are shrunken, as by exposure, in situ, to heat of the order of 100° C. after weaving.

2. A woven fabric as claimed in claim 1, wherein the synthetic fibres which are capable of high lengthwise shrinkage are such as shrink 40% or more in length when heated to a temperature of approximately 100° C.

3. A woven fabric as claimed in claim 1, wherein the relatively non-shrinkable synthetic fibres are such as do not shrink more than 10% in length when heated to 100° C.

4. A woven fabric as claimed in claim 1, wherein the relatively non-shrinkable fibres are of staple-length nylon.

5. A woven fabric according to claim 1, wherein the warps are spun yarns of staple length synthetic fibres.

6. A woven fabric according to claim 1, in which the warp yarns comprise high tenacity, continuous filament polyester fibre.

7. A woven fabric according to claim 1, wherein the warps are cored yarns, having a helical wrapping strand about a core of low-shrinkage synthetic fibre.

8. A woven fabric according to claim 1, having physical characteristics such as result from milling, and wherein there is a proportion, not exceeding 30% by weight, of wool fibre comprised in its constituent yarn.

9. A woven fabric according to claim 1, constituting an endless paper-machine felt wherein the high-shrinkable fibre is shrunken to an extent such as would result from heating it at a temperature of the order of 100° C. for a period of approximately 5 minutes.

10. A woven fabric according to claim 1, and wherein the high-shrinkable fibrous material has physical characteristics such as result from its exposure to a temperature of the order of 100° C.—one face, at least, of the fabric having nap fibres of said high-shrinkable material whose free ends are buried in the body of the fabric, thereby collectively providing a smooth surface.

11. The method of manufacture of woven fabric suitable for use as a paper-machine felt, containing, at least predominantly, synthetic fibres, comprising the step of weaving warp and weft yarns of which the weft yarns consist, at least predominantly, of a combination of crimped synthetic fibres such as do not shrink more than approximately 10% in length when heated to 100° C. and synthetic fibres which are capable of lengthwise shrinkage of at least 40% in length when subjected to such heat, and the further step of shrinking said latter fibres by heat after weaving.

12. The method of making an endless paper-machine felt which comprises, so weaving the warp and weft yarns, according to claim 11, as to form an endless woven band.

13. A woven fabric of a weave structure suitable for use as a paper-machine felt and which, at least predominantly, is of synthetic fibre-forming material, characterized in that the warp yarns are, at least predominantly, of conventional low-shrinkage synthetic fibres and the weft yarns consist of a uniform blend of fibres, some of which are of a kind such that, when subjected to treatment with water at a temperature of the order of 95° C. for a period of approximately 5 minutes, they shrink in length no more than approximately 8%, and other fibres which are of a kind such that, when subjected to said water treatment, they shrink in length as much as 40%.

14. A woven fabric consisting, at least predominantly, of synthetic fibre-forming materials and wherein warp yarns are so concatenated with weft yarns as to form a weave structure such as is useful as a paper-machine felt, characterized in that the warp yarns are of spun uncrimped staple fibres of a length of the order of 4 inches and of a high tenacity nylon, and the wefts are spun yarn consisting at least predominantly of a uniform blend of low and high-shinkage synthetic fibres wherein the high-shrinkage fibres are of a material capable of shrinking in length approximately 50% when heated to approximately 100° C. and which constitute approximately 40% of the weight of the weft yarn, and the low-shrinkage fibres constitute at least 50% of the weight of the weft yarn.

15. A woven fabric according to claim 14, characterized in that the warps are twisted strands each comprising a core of continuous filament, high-tenacity nylon wrapped with a helical winding of textured continuous filament nylon, and the wefts are spun yarns consisting of a uniform blend of low and high-shrinkage synthetic fibres wherein the low shrinkage fibre is continuous edge-crimped nylon cut to 4 inch staple length and constituting 70% by weight of the weft, and the high-shrinkage fibre is capable of shrinking 55% in length when heated to approximately 100° C.

References Cited in the file of this patent

FOREIGN PATENTS 804,151     Great Britain            Nov. 12, 1958